A: 25°C   B: 300°C   C: 650°C

United States Patent Office 3,801,704
Patented Apr. 2, 1974

3,801,704
ALUMINUM PHOSPHATE AND A PRODUCING
METHOD THEREFOR
Masamitsu Kobayashi, Hyogo-ken, and Mitsuano Takahashi, Osaka, Japan, assignors to Teikoku Kako Company Limited, Osaka, Japan
Filed Mar. 9, 1972, Ser. No. 233,253
Int. Cl. C01b 15/16, 25/26
U.S. Cl. 423—309                                      12 Claims

ABSTRACT OF THE DISCLOSURE

The invention is to offer a novel aluminum phosphate of high acidity being water-insoluble and nonvolatile, which is obtained by heating and agitating the mixture of aluminum or Al-containing material, and $P_2O_5$-containing material to effect formation of opaque semisolid substance, and then dehydrating this substance to provide a crystallization thereof. The product is useful for utilization to catalysts, heat resistant materials, antirusting agent or others.

OUTLINE OF THE INVENTION

The invention relates to a novel aluminum phosphate and a method for producing the same, and more particularly this invention is to obtain an aluminum phosphate which is excellent in its utilization for catalysts in chemical reactions, heat resistant materials, antirusting agents, binders or the like and is to establish a method advantageous and suitable for its production.

Aluminum phosphate is a well known substance to be used for said purposes. There have been many studies as to producing methods and structures of aluminum phosphate, and reports concerning the acidic properties of this aluminum phosphate, which say that there is a linear interrelationship between the acidity thereof and X-ray diffraction peak height of $2\theta=11.2°$. However, the conventional methods of producing aluminum phosphates are carried out by mixing aluminum or Al-containing materials and $P_2O_5$-containing materials, and heating this mixture to obtain formation of aluminum phosphate. Since the forming processes or forming conditions have been hardly made clear, the formed materials are mere mixtures of various compounds, and therefore the acidity of the aluminum phosphate according to those methods has the values of at most 0.02 to 0.22 meq./g. In this connection, this acidity means by the number of the acid site of the surface of the solid product or that of the acid center, and usually it is shown with the equivalent number (meq./g.) of n-butylamine per the unit 1 g. of the solid product. Presuming that if the acidity might be increased, the usefulness thereof would be considerably increased in its utilization for catalysts, heat resistant materials or antirusting agents, the preferable working effects have not been up to now expected, because an aluminum phosphate is recognized to have those acidities as they are.

This invention breaks down such conceptions about the conventional aluminum phosphates. The inventors have made extensive practical studies and investigations in details concerning the relationships between the forming processes and conditions, and the acidities of obtained aluminum phosphates. Thus, they have succeeeded in providing a novel aluminum phosphate whose acidity is by far higher than that of the said conventional one and which is water-insoluble, nonvolatile and is not affected with water at all, as well as in establishing a suitable producing method therefor.

The basic object of the invention is to obtain an aluminum phosphate as a solid having high acidity. If the acidity were heightened as said above, the fields of its utilization could be greatly increased. As mentioned there is a linear interrelationship between this acidity and the amounts of substance having X-ray diffraction of $2\theta=11.2°$. The novel aluminum phosphate by this invention shows considerable higher peak in X-ray diffraction of $2\theta=11.2°$ than at least others as well as the high value of more than 3 mq./g. in the acidity. Therefore, the product of this invention has the very high industrial value.

Another object is to provide a method suitable for producing such a product. Through detailed studies and investigations as to the forming process of aluminum phosphate the inventors have found opaque semisolid materials formed in the course of heating and agitating said mixture, and they have also made condition for exactly forming such materials as intermediate products. Further they have built a treating condition under which the said stable aluminum phosphate was obtained from such an opaque semisolid materials by crystallization.

Other features or the actual working effects will be apparent from the following detailed explanation and the embodiments of the invention.

BRIEF EXPLANATION OF THE DRAWING

The drawings show the embodiments of the invention, wherein.

DETAILED EXPLANATION OF THE INVENTION

Figure 1:
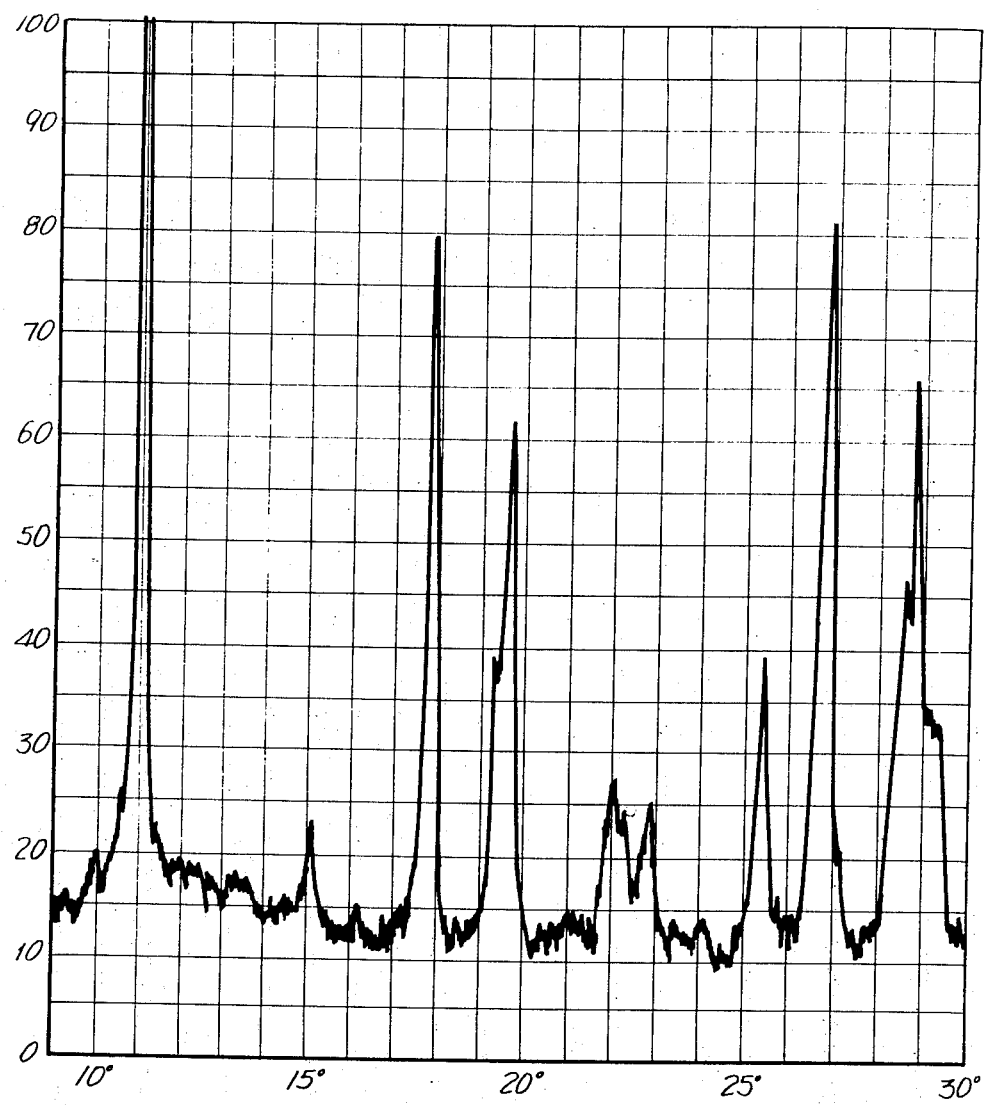
FIG. 1 is a diagram showing the pattern of X-ray diffraction of aluminum phosphate obtained by the method of this invention.

The invention will be explained with the accompanying drawings. In the course of the inventors' studies on the compositions or properties of aluminum phosphates, they have found that they differed owing to the forming conditions thereof. Through various statistical experiments and investigations on acidic properties of the formed aluminum phosphates, they have confirmed that there existed special substance (hereinafter referred as K substance) which had the diffraction peak at $2\theta=11.2°$ in the pattern of X-ray diffraction of aluminum phosphate, and the linear relationship was recognized between the amount of this K substance and the acidity. In the meanwhile it has been presumed that this K substance was a main factor of the acidity of aluminum phosphate. Furthermore, the inventors have ascertained the opaque semisolid materials formed while heating and agitating said mixture aluminum or Al-containing materials and $P_2O_5$-containing materials. They have learned that such intermediate products were dehydrated to provide a crystallization whereby an aluminum phosphate as acidic solid could be obtained stably and exactly, which contained much said K substance and was very high in the acidity though low in the acidic strength.

In order to obtain such a product, the mixture of aluminum or Al-containing material and $P_2O_5$-containing material is heated while being agitated, thereby obtaining the apaque semi-solid intermediate product, and then this product is dehydrated to get a crystallization. The employed aluminum or Al-containing substances may be various kinds of aluminas such as $\alpha$-, $\beta$-, $\gamma$-, $\delta$-, $\theta$-, $\rho$-, $\xi$-, $\chi$-, $\eta$-, or $\kappa$-types; various aluminum hydroxides such as hydrargillite, bayerite, diaspore or boehmite; metal aluminum or various aluminum salts. Suitable $P_2O_5$ containing materials are phosphoric acid, ammonium phosphate, phosphorus pentoxide, phosphorus oxyhalide or the like. Materials of high purity are of course preferable, but this invention optionally selects them rather than particularly limits to special ones in view of the using ways of the product or economy, and usually employs aluminum oxide for industry and 85% phosphoric acid.

Said materials are mixed with a suitable means so that the mol ratio of $P_2O_5/Al_2O_3$ is within 1 to 6, preferably 2 to 5. If being out of this range, the aluminum phosphate of high acidity which is the object of this invention could not be obtained since A, B or C types of aluminum metaphosphate or berlinite type of aluminum orthophosphate ($AlPO_4$) are created.

In this connection, if values of the mol ratio are low even within said range the product is a hard solid, and if being high that would be sand-like.

Said materials are appropriately heated (first heating) in accordance to properties while they are being agitated, and the temperature is generally 90 to 450° C., preferably 250 to 400° C., especially 250 to 300° C. thereby gradually forming opaque semisolid materials (like wet clay of high viscosity). In case the temperature is not elevated as above mentioned such materials are not created, and if it exceeds said level aluminum metaphosphate and other aluminum phosphates of unknown structure are formed, and it is difficult to obtain the object intermediate products. Generally, said first heating treatment is short in the range of high temperature, and long at the low temperature but not specifically limiting. It is preferable to get the opaque semi-solid materials with heating and agitating for around 1 to 2 hours. When active substances such as aluminum hydroxide or $\gamma$-alumina are selected for aluminum materials, preferably the heating is carried out at the lower temperature in said range and in the case of low reactive substances such as $\alpha$-alumina the higher heating temperature range is preferable. If not agitating or stopping for fairly long period in duration of heating, non-reacted alumina is deposited and separated, and therefore the desired materials could not be obtained with high efficiency.

The intermediate products are opaque, soft and semisolid, and those are amorphous wet materials in the X-ray On stopping the heating and cooling, the materials are easily solidfied but have high hydroscopic nature in the atmospheric air. Even once solidified or wetted material is heated up to the desired temperature whereby it may be recovered to the initial opaque semisolid material. It is conceivable that perhaps those intermediate materials have been formed in the foregoing methods, however those arts have not recognized the intermediate substances and, needless to say, of course not selected the treating conditions for such an object, so that its yielding amount was very little, and once formed product was converted into aluminum metaphosphate or others and was not actually made clear during heating and agitating treatments.

For example, in inventor's experiments when X-ray diffraction was effected on the aluminum phosphate obtained by that the mixture of alumina and phosphoric acid, the mole ratio of $P_2O_5/Al_2O_3$ being 2.58, was as conventionally heated and agitated at the temperature of 500° C. for 20 hours, there appeared the diffraction peak of $2\theta=20.5°$ showing A-type of aluminum tetra metaphosphate

Figure 5:
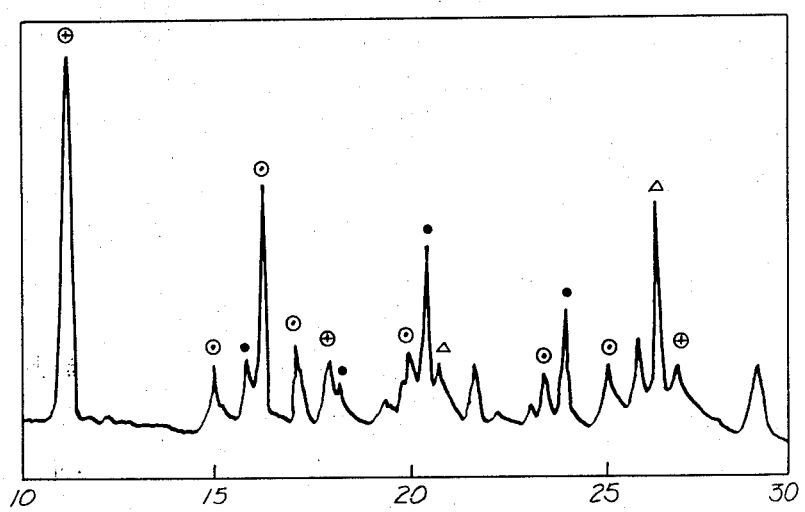
FIG. 5 is a reference diagram showing one example of X-ray diffraction of an aluminum phosphate prepared by another method.

$$[Al_4(P_4O_{12})_3]$$

as shown in FIG. 5; the diffraction peak of $2\theta=16.2°$ showing B-type of $Al_4(P_4O_{12})_3$; the diffraction peak of $2\theta=26.5°$ showing berlinite type of aluminum orthophosphate ($AlPO_4$), as well as the diffraction peak of $2\theta=11.2°$ a peak higher than others' (this shows the presence of K substance mentioned in this invention).

That is, it was found that this obtained material was a mixture of the substances showing these peaks, and the acidities thereof were as No. 1 to No. 12 in following Table I, being very low.

TABLE I

| Sample number | Conditions | | | | Acidity (meq./g.) | | |
|---|---|---|---|---|---|---|---|
| | Mol ratio, $P_2O_5/Al_2O_3$ | Speed temp. elev., ° C./min. | Heating temp., ° C. | Heating period, hrs. | +1.5 pKa | +3.3 pKa | +6.8 pKa |
| 1 | 0.64 | 1.5 | 500 | 20 | 0.08 | 0.06 | 0.06 |
| 2 | 0.65 | 1.5 | 500 | 50 | 0.03 | 0.03 | 0.04 |
| 3 | 0.68 | 11.0 | 500 | 20 | 0.02 | 0.02 | 0.02 |
| 4 | 0.68 | 11.0 | 500 | 50 | 0.02 | 0.01 | 0.02 |
| 5 | 1.97 | 1.5 | 500 | 20 | 0.03 | 0.03 | 0.04 |
| 6 | 3.92 | 1.5 | 500 | 20 | 0.03 | 0.03 | 0.02 |
| 7 | 1.86 | 1.5 | 500 | 50 | 0.03 | 0.03 | 0.11 |
| 8 | 2.54 | 1.5 | 500 | 50 | 0.03 | 0.02 | 0.07 |
| 9 | 3.20 | 5.5 | 500 | 20 | 0.04 | 0.04 | 0.05 |
| 10 | 3.16 | 5.5 | 500 | 50 | 0.02 | 0.01 | 0.02 |
| 11 | 3.76 | (¹) | 500 | 20 | 0.07 | 0.07 | 0.08 |
| 12 | 2.80 | (¹) | 500 | 50 | 0.06 | 0.06 | 0.11 |

¹ Rapid heating.

The crystallization by dehydrating the thus obtained wet semi-solid substance is carried out by generally heating and dehydrating it at the temperature of 200 to 450° C. (second heating), preferably 250 to 350° C. This crystallization can be also accomplished by forming said intermediate product and subsequently heating at 200 to 450° C. to dehydrate this product. But it is more preferable and advantageous for the industrial process to leave it in the air to provide solidification and after then to heat it to effect dehydration. These dehydration and crystallization do not require agitation, and are practised in the various kinds of furnaces. If the heating temperature is below 300° C. in the general range it takes fairly long period, for example in the case of 250° C. the heating time of several days or more is required. If below 200° C., the dehydration and crystallization are not completed in spite of the long period, and the high hygroscopic semi-solid state is maintained. The heating of above 450° C. is not preferable, since the formations of A, B and C types of aluminum metaphosphate or berlinite type of aluminum orthophosphate are developed. The heating or dehydrating times are not especially limited, but a too short time causes the dehydration and crystallization incomplete, and usually the performance of more than 3 hours is desirous. It would be better that the product crystallized by hydration is ground, and soluble substances on the surface are water-washed away.

The aluminum phosphate according to the invention shows the very clear diffraction peak at $2\theta=11.2$ and other peculiar peaks of pure K substance as illustrated in FIG. 1, besides the diffraction peaks of other phosphates are hardly noted. This aluminum phosphate has the very high acidity, at least above 3 meq./g., generally around 10 meq./g., and sometimes up to 10 to 20 meq./g., which shows the absolutely wide difference in comparison with the conventional products of around 0.02 to 0.22 meq./g. The acid strength of the aluminum phosphate obtained in such manner is weaker than pKa+1.5, belonging to the weak acid and being weak in the acid strength. The forming conditions and acidities (meq./g.) of the aluminum phosphates by the invention method and the others are shown in Table II.

TABLE II

| Sample number | Conditions | | | | Acidity (meq./g.) | | |
|---|---|---|---|---|---|---|---|
| | Mol ratio, $P_2O_5/Al_2O_3$ | First heating temp., °C. | Second heating temp., °C. | Second heating period, hrs. | +1.5 pka | +3.3 pka | +6.8 pka |
| 13 | 1.07 | 260 | 300 | 20 | 3.78 | 3.93 | 4.22 |
| 14 | 2.70 | 260 | 300 | 20 | 4.14 | 4.49 | 4.43 |
| 15 | 2.08 | 260 | 300 | 50 | 5.63 | 5.87 | 5.91 |
| 16 | 2.80 | 260 | 300 | 50 | 7.08 | 7.81 | 7.82 |
| 17 | 3.35 | 260 | 300 | 50 | 6.65 | 6.50 | 7.23 |
| 18 | 3.91 | 260 | 300 | 50 | 8.28 | 8.31 | 8.38 |
| 19 | 3.66 | 263 | 300 | 20 | 14.27 | 15.88 | 15.98 |
| 20 | 3.54 | 180–200 | 250 | 10–20 | 4–6 | | |
| 21 | 5.84 | 320 | 400 | 10–20 | 4–6 | | |
| 2² | | | | | 0.008 | 0.009 | 0.010 |

NOTE.—No. 22 Sample shows the acidity of aluminum metaphosphate on market.

The products of the invention and that on the market were dissolved by the universal fusion method and the amounts of $Al_2O_3$ and $P_2O_5$ in the solutions were set and the percentage of $H_2O$ was obtained from the decreased amount of TGA curve. The results are shown in Table III, and the ratio of $P_2O_5/Al_2O_3$ is the same, as is seen, with the composition of the raw materials.

TABLE III

| Sample number | Percent | | | | $P_2O_5/Al_2O_3$ | (Raw material) $P_2O_5/Al_2O_3$ |
|---|---|---|---|---|---|---|
| | $Al_2O_3$ | $P_2O_5$ | $H_2O$ | Total | | |
| a | 30.26 | 67.00 | 12.47 | 99.73 | 3.31 | 3.35 |
| b | 20.86 | 73.00 | 6.54 | 99.40 | 3.50 | 3.91 |
| On market | 23.77 | 65.50 | 10.03 | 99.30 | 2.76 | 2.62 |

The above Table III shows the analyzed values of aluminum phosphate made in said manner, and soluble properties composed of mainly phosphoric acid, adhered on the surfaces or among grains were not water-washed away, which teaches that phosphoric acid scarcely fades if produced by the above said manner.

Table IV shows the values of aluminum phosphate made by said method which has been fully water-washed to exclude soluble properties. According to this table, the values of $P_2O_5/Al_2O_3$ in the resulting aluminum phosphate are almost constant ($P_2O_5/Al_2O_3 \doteq 3$). Said aluminum phosphate (K substance) is analytically pure substance.

TABLE IV

| Sample number | Percent | | | | $P_2O_5/Al_2O_3$ | (Raw material) $P_2O_5/Al_2O_3$ |
|---|---|---|---|---|---|---|
| | $Al_2O_3$ | $P_2O_5$ | $H_2O$ | Total | | |
| c | 16.4 | 66.9 | 16.2 | 99.5 | 2.93 | 3.66 |
| d | 16.1 | 67.8 | 16.5 | 100.4 | 3.03 | 7.02 |
| e | 16.2 | 67.5 | 17.0 | 100.7 | 2.99 | 5.01 |
| f | 17.1 | 69.6 | 13.7 | 100.4 | 2.92 | 3.99 |

Figure 3:
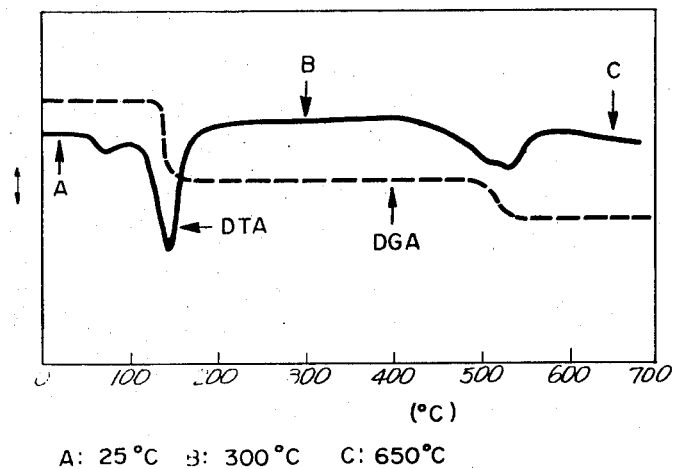
FIG. 3 is a diagram showing one example of the differential thermobalance curve according to this invention.

Furthermore, the product of the invention is insoluble in water or hydrochloric acid, besides being non-volatile. The differential thermobalance curve is as shown in FIG. 3. The high endothermic peaks are noted in the vicinities of 130 to 140° C. and 510 to 530° C. due to the dehydration, and at the same time the weights are decreased, while the differential thermobalance curves of A, B and C types of aluminum metaphosphate and berlinite type of aluminum orthophosphate scarcely change up to 700° C. and the weights are not changed. Accordingly, the product of the invention is a novel one. In this connection, said endothermic peak at 130 to 140° C. is considered to be caused by the coordinated water, and that at 510 to 530° C. would be due to the dehydration of the structural water. The former dehydration is reversible, and if leaving the aluminum phosphate thus dehydrated in the air, it recovers to the initial state, and the latter dehydration is, to the contrary, non-reversible and if leaving it in the air it does not return back to the initial state. In other words, the product which passed through the latter dehydration at 510 to 530° C. is recognized to have been changed into aluminum metaphosphate.

The aluminum phosphate of the invention is scarcely changed in the acidity thereof in the presence of water, and it is noted through the investigations on changes of the acidity influenced by the heating that the acidity is not changed so much up to around 500° C. but if exceeding over 500° C. the acidity is rapidly decreased, from which it is confirmed that the aluminum phosphate is changed to aluminum metaphosphate at the temperature of over 500° C.

Figure 4:
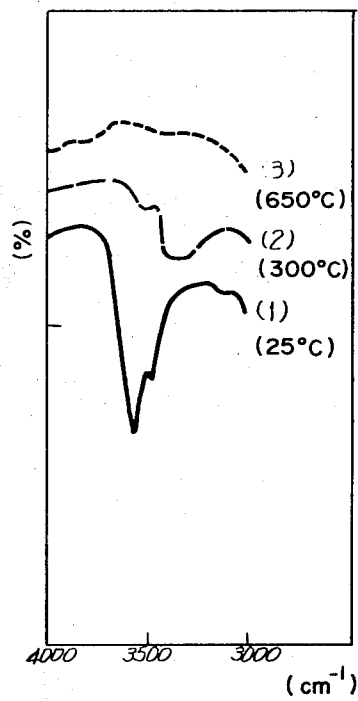
FIG. 4 is a diagram of infrared absorption spectrum on aluminum phosphate of the invention heated at 25° C. 300° C. and 650° C.

Said dehydration processes may be also observed with the infrared absorption spectrum. FIG. 4 shows the infrared absorption spectrum to the water of K substance at 25° C., 300° C. and 650° C., where in the case of 25° C. the peaks of the coordinated water and the structural water appear in the vicinity of 3500 cm.$^{-1}$; in 300° C. the coordinated water is disappeared, and in 650° C. the both waters are completely disappeared.

The aluminum phosphate of the invention is quite different from the conventional ones which have been made by infiltrating phosphoric acid into the inactive substance and heating it, i.e. so-called phosphoric acid catalyst and the like. Such a product has the important property and is offered to the catalysts, heat resistant materials, anti-rusting agents, binders or others and further is a substance of industrially high value.

The actual producing embodiments are explained in the following examples:

EXAMPLE 1

A mixture of 60.5 g. α-alumina and 500 g. phosphoric acid of 85%, the mol ratio of $P_2O_5/Al_2O_3=3.7$, was heated while being agitated in a porcelain crucible and reached a temperature of 262° C. after two hours. The thus obtained opaque wet semi-solid substance was cooled down to room temperature and then it was heated for 5 hours in an electric furnace to 300° C. to effect dehydration. The acidities in the respective acid strengths of the thus obtained aluminum phosphate are shown in Table V.

TABLE V

| Acid strength (pKa) | +1.5 | +3.3 | +6.8 |
|---|---|---|---|
| Acidity (meq./g.) | 14.27 | 15.88 | 15.08 |

As is apparent from above Table V, nothing is, in the acid strength, stronger than pKa+1.5 and the values of the acidities in the pKa+1.5, +3.3 and +6.8 are similar. This fact shows that the acid strength of this substance focuses on pKa=+1.5. Moreover, the acidity is 10 to 500 times of the conventional products, which means to have the prominent characteristics for the solid acid. It will be fully appreciated that this product is useful for the catalyst to effect performance of the chemical reaction without any side reactions.

Said acidity was measured in this example by that 0.5 g. sample was accurately measured, contained in the dried 100 ml. Erlenmeyer's flask, added with 20 ml. benzene, further supplied with 5 ml. benzene solution containing 0.1% indicator (in the case of pKa=+1.5, indicator of benzene azodiphenylamine; in pKa=+3.3, dimethyl yellow and in pKa=+6.8, neutral red), then left for around 1 hour, and thereafter titrated with benzene solution of 0.1 N n-butylamine in the 2 ml. micro buret, and calculated with the following equation Acidity$=0.1 \times f \times V \times 0.5 \times 2 = 0.1 \times V$ (meq./g.)
where f: factor of 0.1 N n-butylamine
  V: ml number of n-butylamine used in titration.

X-ray diffraction on the aluminum phosphate obtained in this example is illustrated in FIG. 1, which has the clear diffraction peak at $2\theta=11.2°$.

EXAMPLE 2

A mixture of 80 g. aluminum hydroxide of 65% $Al_2O_3$ and 500 g. phosphoric acid of 85%, the mol ratio of $P_2O_5/Al_2O_3=4.3$, was heated while being agitated at 280° C. for 30 minutes in a porcelain crucible.

The thus obtained wet semisolid substance was not cooled but was heated for 4 hours in an electric furnace at 350° C. and the crystallized aluminum phosphate was recovered.

The acidities obtained as in Example 1 are shown in Table VI.

TABLE VI

| Acid strength (pKa) | +1.5 | +3.3 | +6.8 |
|---|---|---|---|
| Acidity (meq./g.) | 8.11 | 10.88 | 11.50 |

EXAMPLE OF USE

Aluminum phosphate of the invention was used as a catalyst to effect dehydration on isopropyl alcohol. The porcelain boat charged with 1.0 g. catalyst was inserted in the reacting tube preheated at 300° C. and $N_2$ gas saturated with isopropyl alcohol was passed at 20 ml./min. through said tube.

Figure 2:
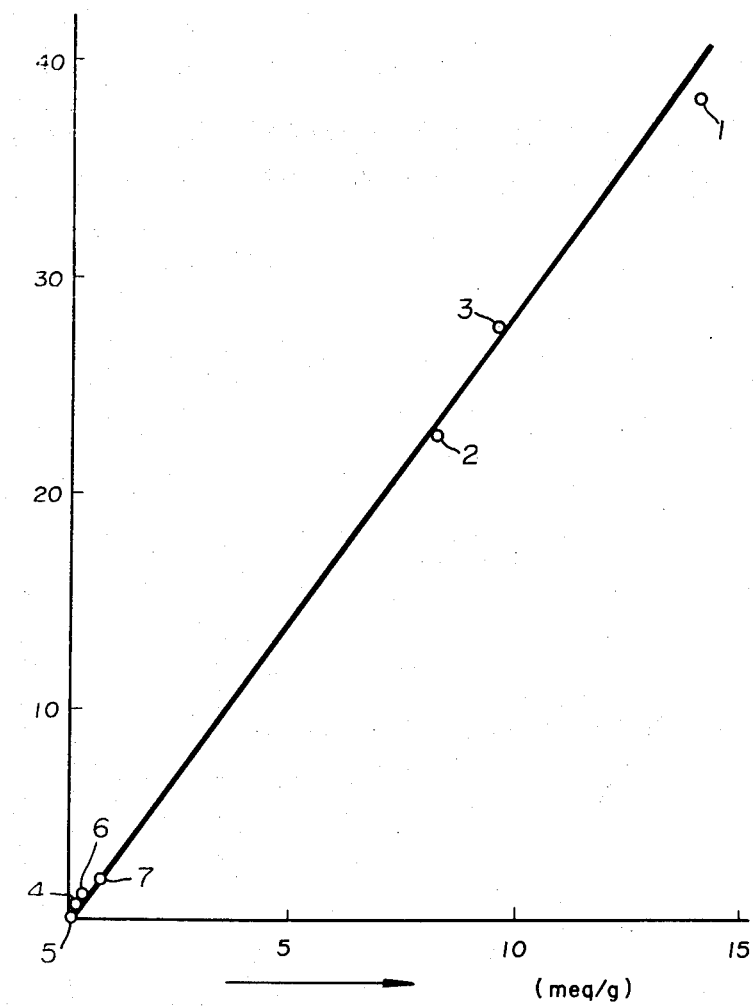
FIG. 2 is a diagram showing the activity of catalyst where an aluminum phosphate of the invention is used as the dehydrated catalyst of isopropyl alcohol.

Reacted propylene and non-reacted isopropyl alcohol were analyzed on the issued gas with the gas chromatograph. FIG. 2 shows the result of the comparison of the catalyst activity with the ratio of the peak height of propylene to that of isopropyl alcohol.

In FIG. 2, the reference numerals of 1, 2 and 3 are the catalyst activities of the aluminum phosphate by the method of the invention (wherein 1 is the product according to Examples 1 and 2 is that by Example 2). Those 4, 5, 6 and 7 show respectively those of the berlinite type of the conventional aluminum phosphate, and the C, A and B types of aluminum metaphosphate. The aluminum phosphate of the invention was not changed in the catalyst activity for a long period, in spite of the water produced by the decomposition of isopropyl alcohol. This fact denotes that this product is nonvolatile and water-inert, besides it is not affected with water at all. Accordingly it is useful for catalysts.

We claim:

1. A dehydrated aluminum phosphate which exhibits the following properties:
   (a) an X-ray diffraction pattern as shown in FIG. 1 and having a high peak at $2\theta=11.2°$;
   (b) an acid strength weaker than pKa=+1.5; and
   (c) an acidity of at least 3 meq./g.

2. Aluminum phosphate set forth in claim 1, showing endothermic peaks due to dehydrations around 130 to 140° C. and 510 to 530° C. in differential thermobalance curve.

3. Aluminum phosphate set forth in claim 1, having absorption spectrums of coordinated water and structural water in vicinity of 3500 cm.$^{-1}$ in infrared absorption spectrum the absorption spectrum for the coordinated water disappearing at above 140° C.; and showing no absorption spectra at above 530° C.

4. The dehydrated aluminum phosphate of claim 1 in the form of an opaque semi-solid material which has been dehydrated.

5. A method of producing a dehydrated aluminum phosphate exhibiting the following properties:
   (a) an X-ray diffraction pattern as shown in FIG. 1 and having a high peak at $2\theta=11.2°$;
   (b) an acid strength weaker than pKa=+1.5; and
   (c) an acidity of at least 3 meq./g. which comprises:
   heating and agitating a mixture comprising:
   (1) an aluminum containing material selected from the group consisting of aluminum, alumina and, aluminum hydroxide and
   (2) a phosphorus containing material selected from the group consisting of phosphoric acid, ammonium phosphate, and phosphorus oxyhalide; the the portions of said mixture having a mole ratio of $P_2O_5/Al_2O_3$ between 1 and 6; the temperature of heating being between about 90° C. and 450° C., the duration of said heating being sufficient to form an opaque semisolid intermediate product;
   and thereafter dehydrating said intermediate product by a further heat treatment at a temperature between about 200° C. and 450° C. and recovering the aluminum phosphate product.

6. The method of claim 5 wherein the mixture comprises alumina and phosphoric acid.

7. The process of claim 5 wherein the mole ratio is between 2 and 5.

8. A method set forth in claim 5, heating the opaque and semisolid intermediate product under the temperature of 200 to 450° C. to effect dehydration and crystallization thereof.

9. A method set forth in claim 8, carrying out the heating up to 250 to 350° C. to effect dehydration and crystallization.

10. A method set forth in claim 5, cooling said formed intermediate product and heating it to obtain crystallization due to dehydration.

11. A method set forth in claim 5, heating and agitating said mixture for 1 to 2 hours to form said intermediate product.

12. A method set forth in claim 5, heating said intermediate product for more than 3 hours to provide crystallization thereof.

References Cited

UNITED STATES PATENTS

| 2,405,884 | 8/1946 | Greger | 423—309 |
| 2,460,344 | 2/1949 | Greger | 423—309 |
| 3,223,481 | 12/1965 | Griesberger et al. | 423—311 |
| 3,227,519 | 1/1966 | Turner et al. | 423—311 |
| 3,361,665 | 1/1968 | Tesche et al. | 423—311 |

FOREIGN PATENTS

| 949,011 | 2/1964 | Great Britain | 23—105 |
| 682,636 | 3/1964 | Canada | 23—105 |

OSCAR R. VERTIZ, Primary Examiner

G. HELLER, Assistant Examiner

U.S. Cl. X.R.

423—3 N